(12) United States Patent
Arnold et al.

(10) Patent No.: US 6,618,802 B1
(45) Date of Patent: Sep. 9, 2003

(54) SUPERSCALAR PROCESSING SYSTEM AND METHOD FOR SELECTIVELY STALLING INSTRUCTIONS WITHIN AN ISSUE GROUP

(75) Inventors: Ronny Lee Arnold, Ft. Collins, CO (US); Donald Charles Soltis, Jr., Fort Collins, CO (US)

(73) Assignee: Hewlett-Packard Company, L.P., Houston, TX (US)

( * ) Notice: Subject to any disclaimer, the term of this patent is extended or adjusted under 35 U.S.C. 154(b) by 0 days.

(21) Appl. No.: 09/390,199

(22) Filed: Sep. 7, 1999

(51) Int. Cl.[7] .............................................. G06F 9/38
(52) U.S. Cl. ...................................... 712/219; 712/215
(58) Field of Search ................................ 712/214, 215, 712/216, 217, 218, 219

(56) References Cited

U.S. PATENT DOCUMENTS

| | | | | |
|---|---|---|---|---|
| 5,537,561 A | * | 7/1996 | Nakajima | 712/216 |
| 5,592,679 A | * | 1/1997 | Yung | 712/219 |
| 5,958,042 A | * | 9/1999 | Tremblay | 712/215 |
| 6,047,368 A | * | 4/2000 | Arya | 712/215 |
| 6,138,230 A | * | 10/2000 | Hervin et al. | 712/216 |

OTHER PUBLICATIONS

Gary Lauterbach, "MicroProcessor Forum 97–Sun's Next Generation High End Sparc Microprocessor", Oct. 14–15, 1997, pp. 3–6.
Patterson, Hennessy, and Golberg, "Computer Architecture A Quantitative Approach", 1996, pp. 150–154, 191–193.

* cited by examiner

Primary Examiner—Richard L. Ellis (57) ABSTRACT

A processing system receives instructions from a computer program. Each instruction is included within an issue group such that each issue group only includes instructions that may be simultaneously processed. The issue groups are then sequentially transmitted to a plurality of pipelines that simultaneously processes and executes the instructions within the issue groups in program order. During execution, the instructions within an issue group are analyzed to determine whether any of the instructions in the issue group is dependent on unavailable data. Any of the instructions in the issue group determined to be dependent on unavailable data are independently stalled, while execution of other instructions in the issue group is allowed to continue.

29 Claims, 7 Drawing Sheets

SUPERSCALAR PROCESSING SYSTEM AND METHOD FOR SELECTIVELY STALLING INSTRUCTIONS WITHIN AN ISSUE GROUP

BACKGROUND OF THE INVENTION

1. Field of the Invention

The present invention generally relates to computer processing techniques and, in particular, to a superscalar processing system and method that executes instructions in an in-order fashion and that independently stalls processing of the instructions, when necessary.

2. Related Art

In most early computer processors, a pending instruction of a computer program was fully executed, and the results of the execution were written to a register or a location in memory before commencing execution of the next instruction of the program. The execution of the instructions occurred one at a time, and, therefore, errors from data dependency hazards could be easily prevented.

As used herein, a "data dependency" refers to a situation where a first instruction during execution generates or retrieves data that is needed for the execution of a second instruction. In such a situation, a data dependency is said to exist between the two instructions, and the timing of the execution of the instructions must be controlled such that the needed data produced by execution of the first instruction is available during execution of the second instruction. If steps are not taken to ensure that the first instruction will always execute before the second instruction, then a data dependency hazard exists. A "data dependency hazard" refers to a situation in which an error is possible because an instruction dependent on data from another instruction may execute before the other instruction and, therefore, may utilize incorrect data during execution.

When a processor executes instructions of a computer program one at a time, as described above, preventing errors from data dependency hazards is relatively simple. In this regard, as long as each instruction dependent on data from another instruction is input into the processor after the other instruction, errors caused by data dependency hazards should not occur.

However, to increase the performance of many processors, pipeline processing was developed. In pipeline processing, a single pipeline simulataneously processes multiple instructions. Therefore, execution of one instruction in the pipeline may be commenced before the results of execution of a preceding instruction in the pipeline are available. Consequently, with pipeline processing, errors from data dependency hazards are possible.

Most pipeline processors utilize a control mechanism to prevent errors from data dependency hazards. The control mechanism detects data dependencies that exist between instructions input into the processor. During the execution of each instruction, the control mechanism determines whether the instruction being executed (referred to hereafter as the "pending instruction") requires data produced by the execution of another instruction. If so, the control mechanism then determines whether the other instruction has been executed, at least to the point where the needed data is available. If this data is not yet available, the control mechanism stalls (i.e., temporarily stops) execution of the pending instruction until the necessary data becomes available.

Stalling of the pending instruction is usually accomplished by asserting a stall signal transmitted to the pipeline executing the pending instruction. In response to the stall signal, the pipeline is designed to stop execution of the pending instruction until the stall signal is deasserted by the control mechanism. Once the necessary data becomes available, the control mechanism deasserts the stall signal, and in response, the pipeline resumes execution of the pending instruction.

To further reduce the amount of time required to process instructions, parallel processing, sometimes known as superscalar processing, was developed. In parallel processing, a plurality of pipelines are defined that simultaneously execute instructions. One type of parallel processing is out-of-order processing. In out-of-order processing, each pipeline of a processor simultaneously executes different instructions independently of the other pipeline(s).

It typically takes different amounts of time for different instructions to execute, and it is, therefore, possible for an instruction of one pipeline to be fully executed before another instruction of another pipeline, even though the other instruction was input into its respective pipeline first. Accordingly, instructions are not necessarily executed in the same order that they were input into the pipelines, and as a result, the control mechanism required to avoid errors from data dependency hazards is relatively complex in out-of-order processors. Furthermore, as the number of pipelines is increased, the complexity of the control mechanism increases dramatically. Consequently, many conventional parallel processors, particularly processors having a large number of pipelines, employ an in-order type of processing in lieu of the out-of-order type of processing described above.

During in-order processing, the instructions being processed by the different pipelines are stepped through the stages of the pipelines on certain edges of a system clock signal. In this regard, the processing of instructions in a pipeline is usually divided into stages, and each stage of the pipeline simultaneously processes a different instruction.

As an example, the processing performed by each pipeline may be divided into a register stage, an execution stage, a detect exceptions stage, and a write stage. During the register stage, any operands necessary for the execution of an instruction are obtained. Once the operands have been obtained, the processing of the instruction enters into the execution stage in which the instruction is executed. After the instruction has been executed, the processing of the instruction enters into a detect exceptions stage in which conditions, such as overruns during execution, for example, that may indicate data unreliability are checked. After the detect exceptions stage is completed, a write stage is entered in which the results of the execution stage are written to a register or a location in memory.

A key feature of in-order processing is that each instruction of an issue group steps through each stage at the same time. An "issue group," as defined herein, is a set of instructions simultaneously (i.e., during the same clock cycle) processed by the same stage of different pipelines within a single processor. As an example, assume that each stage of each pipeline processes one instruction at a time, as is typically done in the art. The instructions in the detect exceptions stage of the pipelines form a first issue group, and the instructions in the execution stage of the pipelines form a second issue group. Furthermore, the instructions in the register stage of the pipelines form a third issue group. Each of the issue groups advances into the next respective stage in response to an active edge of the system clock signal. In other words, the first issue group steps into the write stage, the second issue group steps into the detect exceptions stage, and the third issue group steps into the execution stage in response to an active edge of the system clock signal.

As used herein, an "active edge" is any edge of the system clock signal, the occurrence of which induces each unstalled instruction in a pipeline to advance to the next stage of processing in the pipeline. For example, assume that a processor is designed to step each unstalled instruction into the next stage of processing every three clock cycles. In this example, the active edges could be defined as every third rising edge of the clock signal. It should be noted that which edges of the clock signal are designated as "active edges" is based on design parameters and may vary from processor to processor.

During in-order processing, each instruction in one issue group is prevented from passing another instruction in another issue group. In other words, instructions of one issue group input into the pipelines after the instructions of another issue group are prevented from entering into the same stage processing the instructions of the other issue group. Therefore, at any point in time, each stage of the pipelines is respectively processing instructions from only one issue group. Since instructions from different issue groups are prevented from passing each other, the control mechanism for controlling the pipelines and for preventing errors from data dependency hazards is greatly simplified relative to out-of-order processing.

However, the reduction in the complexity of the control mechanism comes at a cost. In this regard, in-order processing prevents some instructions from traversing through their pipelines at the fastest possible rate. In this regard, to ensure that an instruction of one issue group does not pass an instruction of another issue group, an instruction is not allowed to proceed to the next stage until all of the instructions in the issue group are ready to proceed to the next stage. In other words, if one instruction of an issue group is stalled, all of the instructions of the issue group are stalled, even if some of the instructions of the issue group have sufficient data available to complete the current stage and to proceed to the next stage.

Thus, a heretofore unaddressed need exists in the industry for providing a system and method of increasing the efficiency of parallel processors that employ in-order processing.

SUMMARY OF THE INVENTION

The present invention overcomes the inadequacies and deficiencies of the prior art as discussed hereinbefore. Generally, the present invention provides a system and method for efficiently processing instructions from a computer program by enabling processing of instructions within an issue group to execute while independently stalling other instructions in the issue group.

In architecture, the processing system of the present invention utilizes a plurality of pipelines, an instruction dispersal unit, and a control mechanism. The instruction dispersal unit receives instructions of a computer program and defines issue groups based on the received instructions. Each of the issue groups is sequentially transmitted to the pipelines and includes instructions that may be simultaneously processed by the pipelines.

The control mechanism analyzes the instructions in the issue groups as the instructions are being processed by the pipelines. The control mechanism determines whether any instructions in one of the issue groups should be stalled. The control mechanism then asserts stall signals across connections respectively coupled to each of the pipelines processing an instruction within the one issue group that should be stalled, and the control mechanism deasserts stall signals across connections respectively coupled to each of the pipelines processing the other instructions within the one issue group. Each of the pipelines receiving one of the asserted stall signals stalls an instruction in the one issue group, and each of the pipelines receiving one of the deasserted stall signals allows processing of an instruction in the one issue group to continue.

The present invention can also be viewed as providing a method for efficiently processing instructions of computer programs. The method can be broadly conceptualized by the following steps: receiving instructions from a computer program; defining issue groups based on the instructions, each of the issue groups including instructions that may be simultaneously processed; sequentially transmitting the issue groups to a plurality of pipelines; simultaneously processing each instruction in one of the issue groups; stalling an instruction in the one issue group; and enabling processing of other instructions in the one issue group while the instruction is stalled in the stalling step.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE PREFERRED EMBODIMENT

Figure 1:
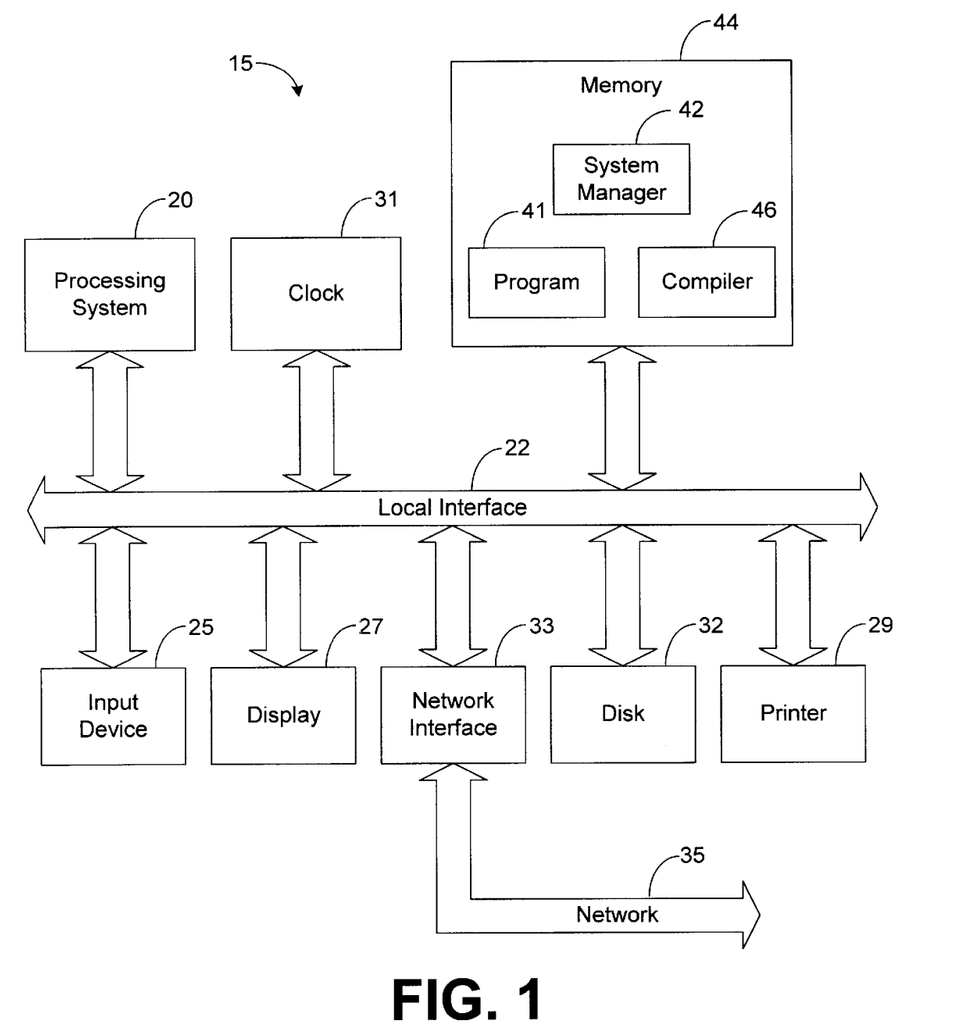
FIG. 1 is a block diagram illustrating a computer system that employs a processing system in accordance with the present invention.

The present invention relates to a processing system and method for efficiently processing instructions in a parallel, in-order fashion. FIG. 1 depicts the preferred embodiment of a computer system 15 employing the processing system 20 of the present invention. The processing system 20 of the preferred embodiment is preferably implemented in hardware, although it is possible to implement portions of the processing system 20 in software, if desired.

As shown by FIG. 1, the computer system 15 includes a local interface 22, which can include one or more buses, that allows the processing system 20 to communicate with the other elements of the computer system 15. Furthermore, an input device 25, for example, a keyboard and/or a mouse, can be used to input data from a user of the system 15, and a screen display 27 and/or a printer 29, can be used to output data to the user. A system clock 31 produces a clock signal, which is used through techniques known in the art to control the timing of data communicated by the system 15. A disk storage mechanism 32 can be connected to the local interface 22 to transfer data to and from a nonvolatile disk (e.g., magnetic, optical, etc.). If desired, the system 15 can be connected to a network interface 33 that allows the system 15 to exchange data with a network 35.

The system 15 additionally includes a program 41, a system manager 42, and a compiler 46 stored in memory 44. The program 41 includes instructions that are to be processed and executed by the processing system 20. The system manager 42 is designed to receive inputs from input device 25 and/or network interface 33 and to transmit the instructions of the program 41 to the processing system 20, when desired. Before transmitting the instructions of the program 41 to the processing system 20, the instructions are preferably first translated by the compiler 46 into a form compatible with the processing system 20. For example, if the instructions of the program 41 are written in a high level computer language, for example, C or Fortran, then the compiler 46 is designed to translate the instructions into a machine language that is compatible with the processing system 20.

Figure 2:
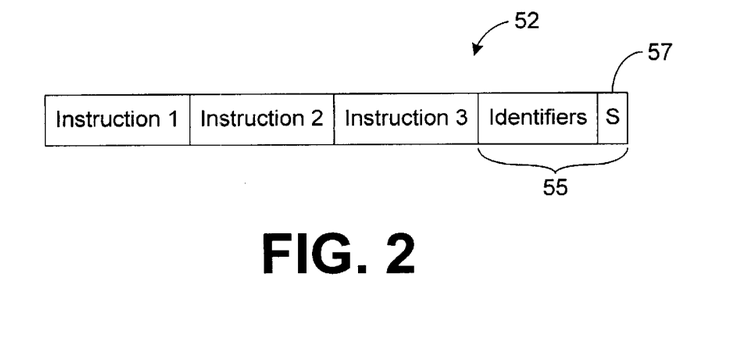
FIG. 2 is a block diagram illustrating a exemplary bundle of instructions transmitted to the processing system depicted in FIG. 1.

In the preferred embodiment, the compiler 46 defines instruction bundles that include the translated instructions and that can be transmitted directly to the processing system 20. FIG. 2 depicts an instruction bundle 52 in accordance with the principles of the present invention. As shown by FIG. 2, each bundle 52 includes data defining one or more instructions, and each bundle 52 also includes a header 55. The header 55 includes identifier information that identifies the type of instructions that are included in the bundle 52. For example, the header 55 may include information indicating that the first instruction in the bundle 52 is a memory operation instruction, that the second instruction in the bundle 52 is an integer operation instruction, that the third instruction in the bundle 52 is a floating point operation, etc. The header 55 also includes a stop bit 57, which will be described in more detail hereinbelow.

In defining the instruction bundles 52, the compiler 46 is preferably designed to check for data dependencies and to ensure that no instruction having a data dependency with another instruction is placed in the same bundle 52 with the other instruction. In addition, the compiler 46 is designed to consecutively transmit the bundles 52 to processing system 20 in a particular order (referred to as "program order"), and the compiler 46 is preferably designed to ensure that no data dependencies exist between instructions in bundles 52 that are bounded by asserted stop bits 57. Therefore, if the processing system 20 receives a string of instruction bundles 52 having deasserted stop bits 57, then the processing system 20 is aware that none of the instructions in the string is dependent on other instructions in the string.

It should be noted that transmitting the instructions to the processing system 20 in the instruction bundles 52 described hereinabove helps to improve the optimal performance of the system 20. However, it is not necessary for the instructions to be transmitted to the processing system 20 in the bundles 52 described hereinabove. Any technique for transmitting the instructions to the processing system 20 should be suitable for implementing the present invention.

Figure 3:
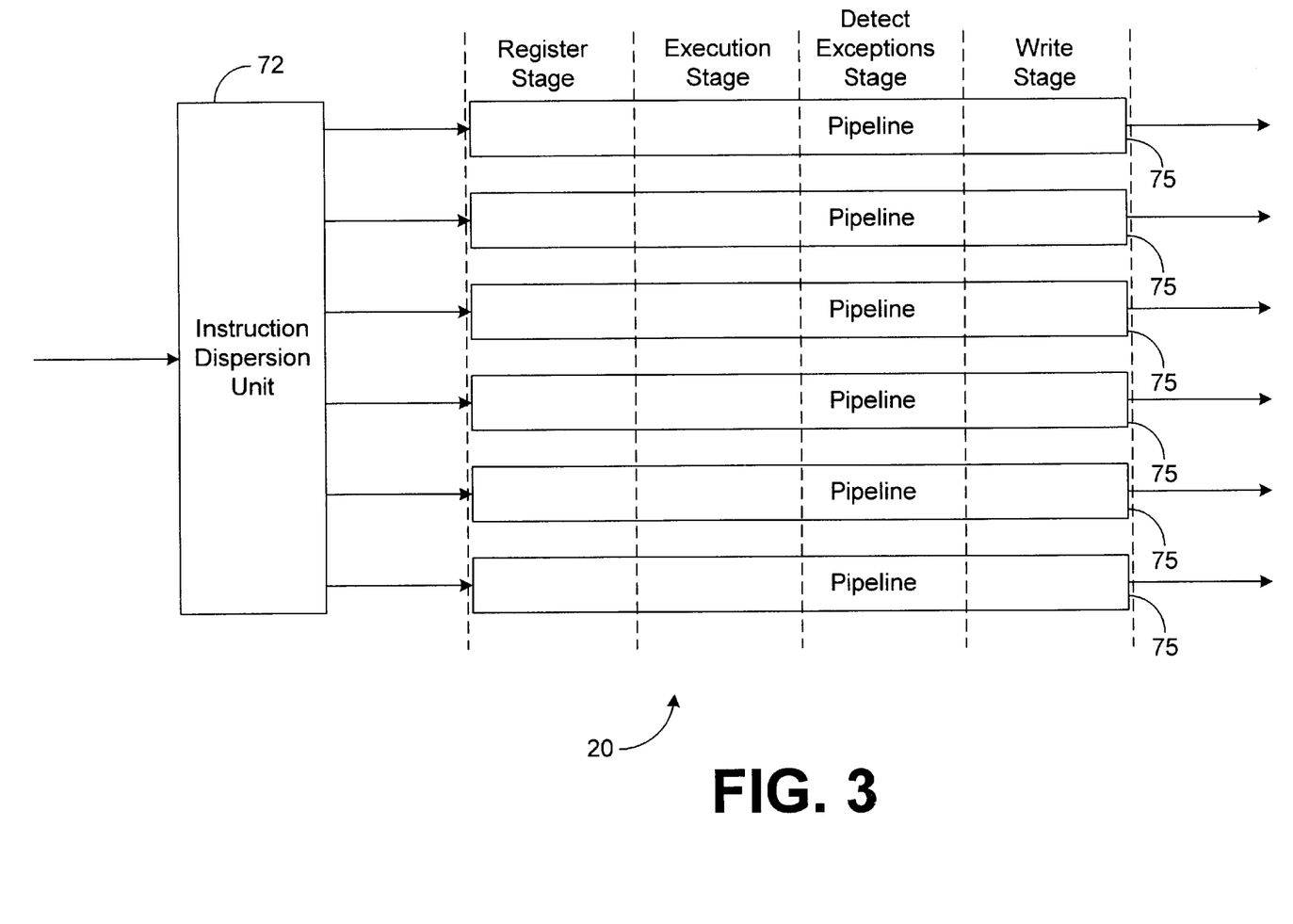
FIG. 3 is a block diagram illustrating a more detailed view of the processing system depicted in FIG. 1.

As shown by FIG. 3, the processing system 20 includes an instruction dispersal unit (IDU) 72 that is designed to receive the instructions transmitted to the processing system 20. The IDU 72 is configured to define issue groups with the instructions received by the IDU 72 and to transmit the instructions of a single issue group to pipelines 75 such that each instruction in the issue group is received by only one of the pipelines 75 on an active clock edge and each pipeline 75 receives no more than one of the instructions.

Figure 4:
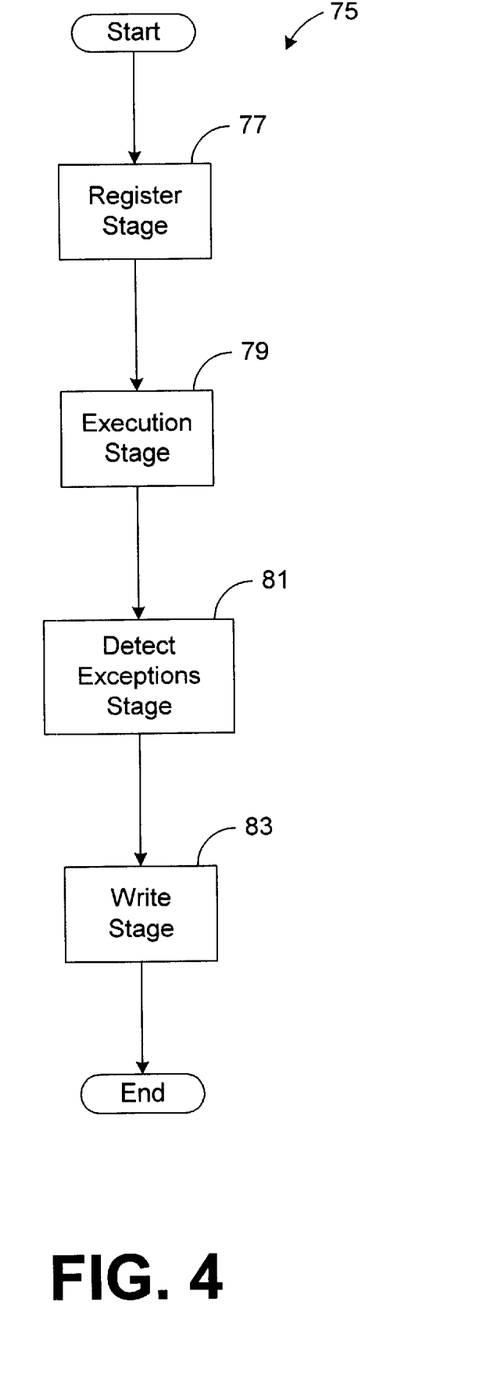
FIG. 4 is a flow chart illustrating the processing stages of the processing system depicted in FIG. 1.

The pipelines 75 are designed to further process and execute the received instructions. Similar to conventional pipelines in parallel in-order processors, the pipelines 75 preferably process the received instructions in stages. FIG. 4 depicts an exemplary set of stages for the pipelines 75. In this regard, each of the pipelines 75 receives an instruction and sequentially processes the instruction in a register stage 77, in an execution stage 79, in a detect exceptions stage 81, and finally in a write stage 83. These stages are described in more detail in the Background section, and it should be noted that other stages and/or other combinations of stages may be utilized to process and execute the instructions.

In defining the issue groups, the IDU 72 is preferably designed to ensure that each instruction is only transmitted to a pipeline 75 compatible with the instruction. In this regard, some of the pipelines 75 may only be designed to handle certain types of instructions. For example, one or more of the pipelines 75 may be configured to only handle memory operation instructions, integer operation instructions, floating point instructions, or other known types of instructions. Accordingly, the IDU 72 is designed to analyze the received instructions and to define the issue groups such that appropriate types of instructions are transmitted to each pipeline 75. In the preferred embodiment, the IDU 72 may analyze the header 55 of each instruction bundle 52 to determine which instructions are compatible with which pipelines 75.

The IDU 72 is also designed to ensure that two instructions having a data dependency therebetween are not placed in the same issue group. Therefore, each instruction that enters into the first stage of processing (i.e., the register stage 77 in the preferred embodiment) on an active edge of the clock signal produced by clock 31 has no data dependencies with any of the other instructions entering into the first stage on the same clock edge. Since the stop bits 57 of the instruction bundles 52 indicate whether consecutive instruction bundles 52 include data dependencies, as described hereinabove, the IDU 72 may utilize the stop bits 57 to simplify the process of defining issue groups. In this regard, the IDU 72 may place any of the instructions of a string of bundles 52 having deasserted stop bits 57 into the same issue group without checking for data dependencies between the instructions, since the compiler 46 has guaranteed, via assertion/deassertion of the stop bits 57, that there are no data dependencies between these instructions.

The IDU 72 is further designed to insert data into each instruction indicating the instruction's age with respect to the other received instructions. In this regard, it is well known that the processing of instructions should be completed in the same order (referred to as "program order") defined by the original program 41. The program order is the order that the instructions are received by the processing system 20.

Each instruction's age is based on its location within the program order. For example, the first instruction to be executed in a program 41 (i.e., the first instruction of a program that is transmitted to processing system 20) is the oldest instruction, and all other instructions of the program are younger than this instruction. The next instruction to be executed after the first instruction (i.e., the next instruction of a program received by the processing system 20 after the first instruction) is younger than the first instruction but older than the rest of the instructions of the program 41. Moreover, the last instruction that should be executed is the youngest instruction. Even though superscalar processors process multiple instructions at once, the instructions should complete processing (i.e., complete the write stage in the example described hereinbefore) in the same order as if a non-superscalar processor were stepping through the program 41 and processing the instructions one at a time.

To ensure that younger instructions do not complete processing prior to older instructions, the IDU 72 preferably does not assign an older instruction to an issue group that will be transmitted to pipelines 75 after an issue group containing a younger instruction. Furthermore, to help ensure that younger instructions do not ultimately complete processing before older instructions, the IDU 72 inserts age data in the instruction so that determinations during the processing by pipelines 75 can be made as to which instructions should execute first. How this age data is used to maintain "in program order" processing will be described in further detail hereinafter.

Once the issue groups have been defined, the IDU 72 is designed to sequentially transmit each issue group in an in-order fashion to the pipelines 75. Therefore, each instruction within an issue group is transmitted to its respective pipeline 75 on the same active edge of the clock signal. Ideally, each instruction within each issue group is completely processed in its respective stage between active edges of the clock signal such that each issue group steps into the next stage on the same clock edge. Therefore, each instruction of the issue group in the register stage 77 enters into the execution stage 79 on the same clock edge that the instructions of the issue groups in the execution stage 79 and detect exceptions stage 81 respectively step into the detect exceptions stage 81 and the write stage 83. Furthermore, as the instructions of the issue groups in the register stage 77, execution stage 79, and detect exceptions stage 81 step into the next respective stage, instructions of a new issue group step into the register stage 77. As a result, the processing of the issue groups is in-order in that no instruction from one issue group enters into the same stage as an instruction in another issue group.

However, in certain situations, it may take longer than expected to execute an instruction. For example, an instruction dependent on data from another instruction in another issue group may enter into the execution stage 79 before the necessary data from the other instruction is available. If this occurs, the instruction in the execution stage 79 must be stalled (ie., temporarily prevented from executing) until the necessary data is available. In this situation, conventional wisdom suggests that a stall signal should be transmitted to the execution stage 79 of each of the pipelines 75 to stall the issue group in the execution stage 79 such that the instruction in the execution stage 79 is prevented from executing before the necessary data is available. Furthermore, to prevent another issue group from entering the execution stage 79 before the issue group currently in the execution stage 79 has completed the execution stage 79, a stall signal also needs to be transmitted to the earlier stages (i.e., the register stage 77) of each of the pipelines 75. As a result, each instruction in the execution stage 79 and the register stage 77 is stalled until the necessary data for execution of each instruction in the execution stage 79 is available. Once this occurs, the aforementioned stall signals should be deasserted and the stalled issue groups should be allowed to proceed into the next stages 79 and 81.

Figure 5:
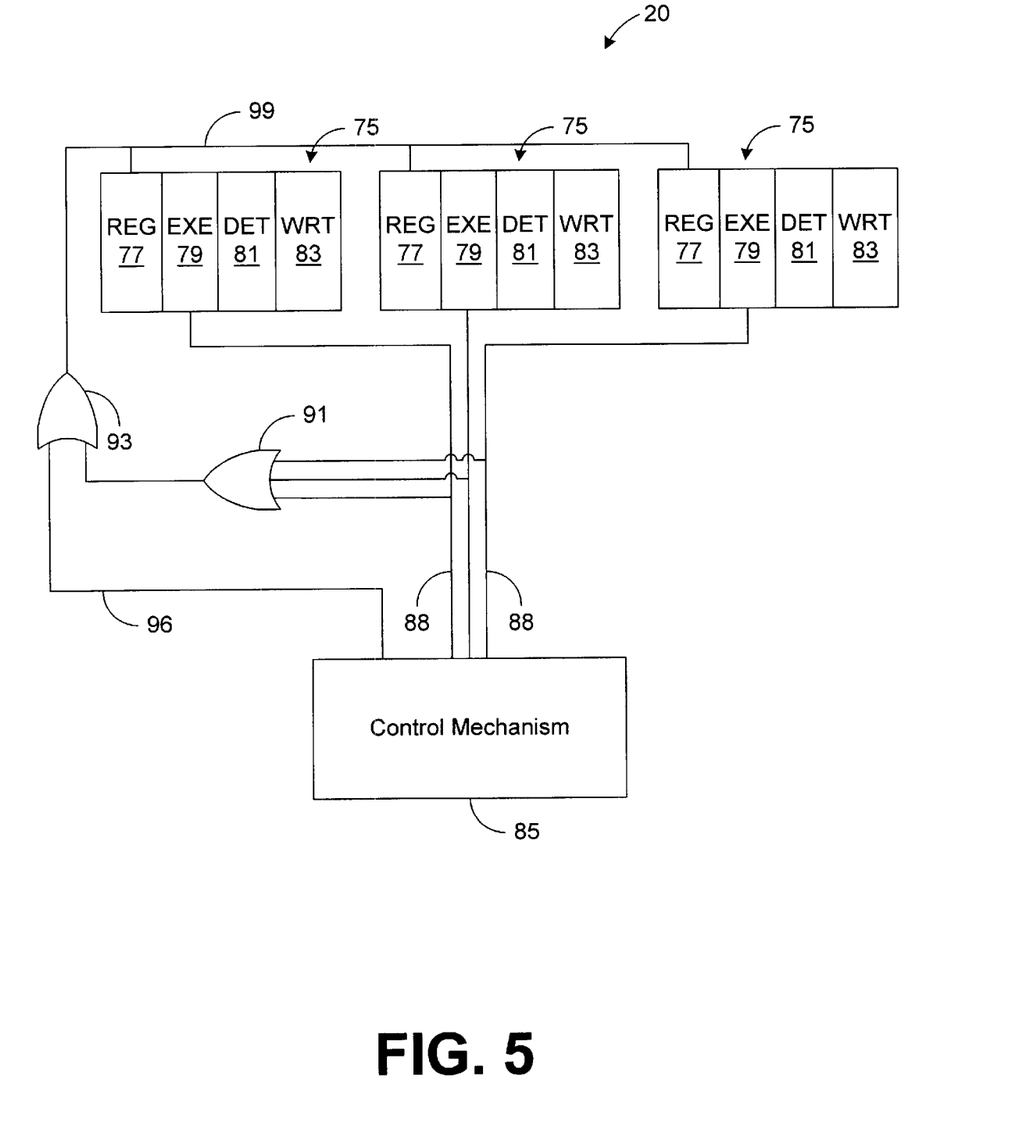
FIG. 5 is a block diagram illustrating a detailed view of a control mechanism coupled to the pipelines of the processing system depicted in FIG. 3.

However, the inventors of the present invention have realized that such conventional wisdom needlessly stalls some of the instructions in the execution stage 79. Therefore, the system 20 preferably includes a control mechanism 85 (FIG. 5) that is designed to transmit an independent stall signal to the execution stage 79 of each pipeline 75. In this regard, the control mechanism 85 is coupled to a portion of each pipeline 75 that performs the execution stage 79 via connections 88, and each connection 88 is coupled to a different pipeline 75, as shown by FIG. 5.

Based on the age data inserted by the IDU 72, the control mechanism 85 analyzes the instructions in the execution stage 79 "in program order" and determines whether the analyzed instructions are dependent on unavailable data. Therefore, the control mechanism 85 analyzes the oldest instruction in the issue group and then proceeds to the next oldest instruction until all of the instructions have been analyzed or until an instruction is found that is dependent on unavailable data.

In this regard, if the control mechanism 85 determines that an instruction being analyzed is not dependent on unavailable data, the control mechanism 85 deasserts the stall signal on the connection 88 that is coupled to the pipeline 75 processing the instruction under analysis. Then, the control mechanism 85 analyzes the next oldest instruction. When the control mechanism 85 determines that an instruction in the execution stage 79 of one of the pipelines 75 is dependent on unavailable data, the control mechanism 85 is configured to assert a stall signal across the connection 88 coupled to the pipeline 75 processing the instruction that is dependent on unavailable data. Furthermore, to ensure that "program order" is maintained, the control mechanism 85 then asserts the stall signals on the connections 88 connected to the remaining pipelines 75 (i.e., the pipelines 75 processing younger instructions than the instruction currently being analyzed).

Therefore, the instructions in the execution stage 79 that are ready to execute and that are older than any of the instructions dependent on unavailable data (as defined by the age data inserted by IDU 72) are allowed to execute and to proceed stepping through the other stages (i.e., the detect exceptions stage 81 and the write stage 83) on the active edges of the clock signal, while the instructions dependent on unavailable data and the instructions younger than any of the instructions dependent on unavailable data (as defined by the age data inserted by the IDU 72) are stalled in the execution stage 79.

The control mechanism 85 continues to monitor the stalled instructions. Once a stalled instruction has access to the necessary data for execution and is older than all other instructions in the execution stage 79 dependent on unavailable data, the stall signal applied to the stalled instruction's pipeline 75 is deasserted, and the stalled instruction is, therefore, allowed to proceed (i.e., step) into the next stages 81 and 83 on the next active edges of the clock cycle.

To maintain in-order processing, it is necessary to stall the issue group in each stage prior to the execution stage 79, when any one of the instructions in the execution stage 79 is stalled. Therefore, the signals on connections 88 are preferably input to an OR gate 91, as shown by FIG. 5. If any of the connections 88 are asserted, then the output of the OR gate 91 is also asserted. The output of OR gate 91 is input to OR gate 93 along with a signal on connection 96. The control mechanism 85 is designed to assert the signal on connection 96 when the control mechanism 85 detects a condition in which any one of the instructions in the register stage 77 needs to be stalled. If either the output of OR gate 91 or the signal on connection 96 is asserted, then the output of OR gate 93 is asserted.

The output of OR gate 93 is coupled to the portion of each pipeline 75 that performs the register stage 77, via connection 99. When the signal on connection 99 is asserted, the instructions in the register stage 77 are stalled. Therefore, the issue group in the register stage 77 is stalled whenever the control mechanism 85 detects that an instruction in the register stage 77 or an instruction in the execution stage 79 should be stalled. Accordingly, none of the instructions in the register stage 77 steps into the execution stage 79 until each instruction in the execution stage 79 has completed execution and has stepped out of the execution stage 79. As a result, the in-order nature of the processing system 20 is preserved.

It should be noted that it may be necessary to stall the issue groups in stages later than the execution stage 79 in certain circumstances. Therefore, the control mechanism 85 is designed to assert stall signals transmitted to the detect exceptions stage 81 and the write stage 83. In the preferred embodiment, the control mechanism 85 is designed to assert the signals on connections 106 and 105 (FIG. 6) to respectively stall the issue groups in the detect exceptions stage 81 and the write stage 83.

Figure 6:
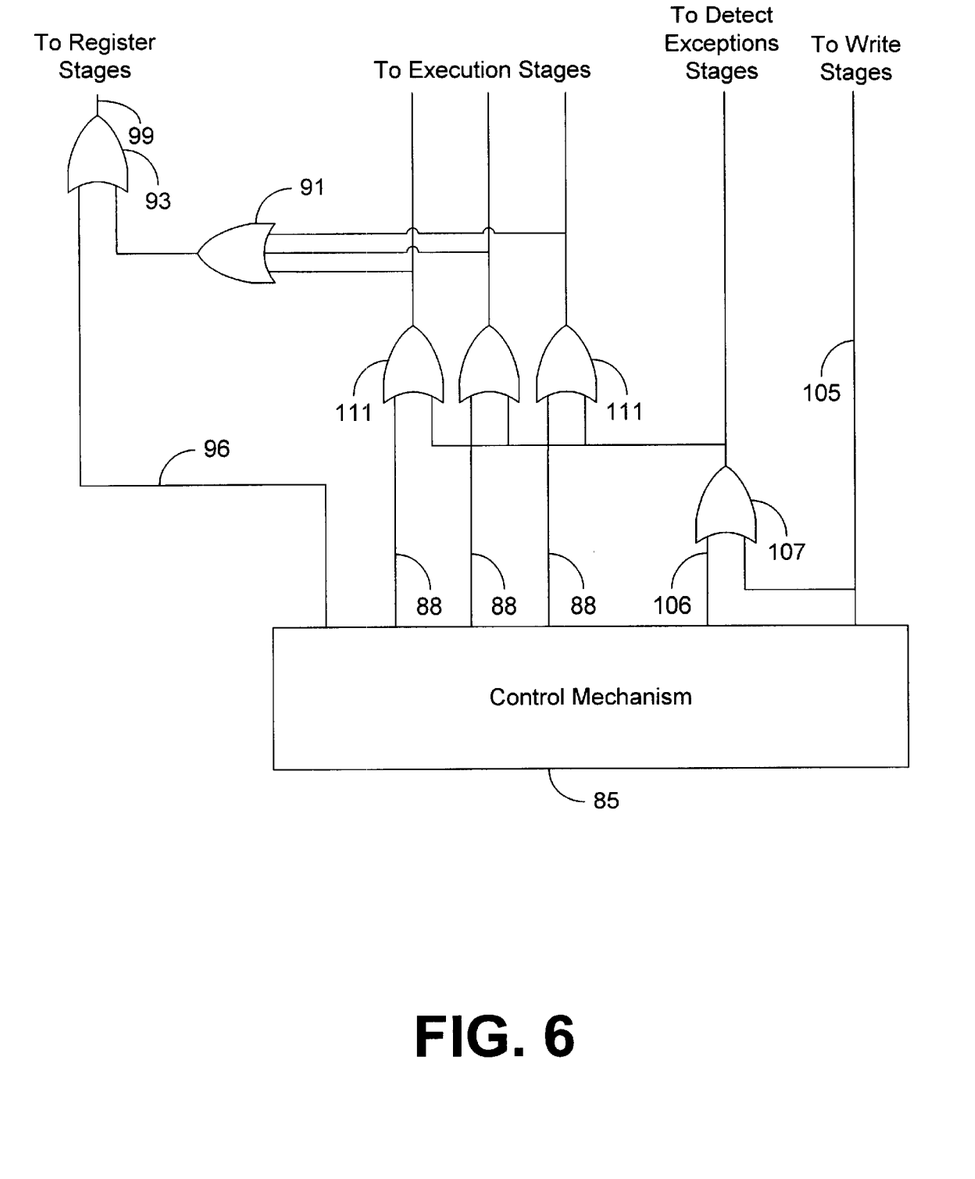
FIG. 6 is a block diagram illustrating a more detailed view of the control mechanism depicted in FIG. 5 and of the connections between the control mechanism and the pipelines depicted in FIG. 3.

As previously set forth, to preserve the in-order nature of the system 20, it is necessary to stall the issue groups in stages earlier than a stage having a stalled instruction. Therefore, an asserted stall signal applied across connection 105 is applied to each earlier stage 77, 79, and 81 of the pipelines 75 via OR gates 91, 93, 107, and 111, and an asserted stall signal applied across connection 106 is applied to each earlier stage 77 and 79 of the pipelines 75 via OR gates 91, 93, 107, and 111. If any stage 77, 79, 81, or 83 does not have an asserted stall signal applied to it, then the stage 77, 79, 81, or 83 is enabled to step its current instructions into the next stage on the next active edge of the clock signal.

It should be noted that OR gates 91, 93, 107, and 111 are not essential features of the present invention. In this regard, the OR gates 91, 93, 107, and 111 enable the instructions in earlier stages to be stalled when an instruction in a later stage is stalled, thereby preserving the in order processing of the system 20. However, this same functionality may be implemented by many different configurations and devices, making OR gates 91, 93, 107, and 111 unnecessary. Furthermore, the OR gates 91, 93, 107, and 111 may be included within the circuitry of the control mechanism 85, if desired.

Operation

The preferred use and operation of the processing system 20 and associated methodology are described hereafter.

Instructions from a computer program 41 are compiled by a compiler 46 and transmitted to processing system 20 (FIG. 1). An IDU 72 (FIG. 3) in the processing system 20 receives the instructions and separates the instructions into issue groups, which are sets of instructions that do not have data dependencies between the other instructions of the set. The issue groups are then sequentially stepped into and through the stages 77, 79, 81, and 83 of the pipelines 75 on active edges of the clock signal produced by system clock 31. Therefore, in the absence of a stall, instructions in any of the stages 77, 79, 81, or 83 advance into the next stage on the same edges of the clock signal, and any instruction from one issue group never enters into the same stage 77, 79, 81, or 83 in which an instruction from another issue group is currently being processed in any of the pipelines 75.

Figure 7:
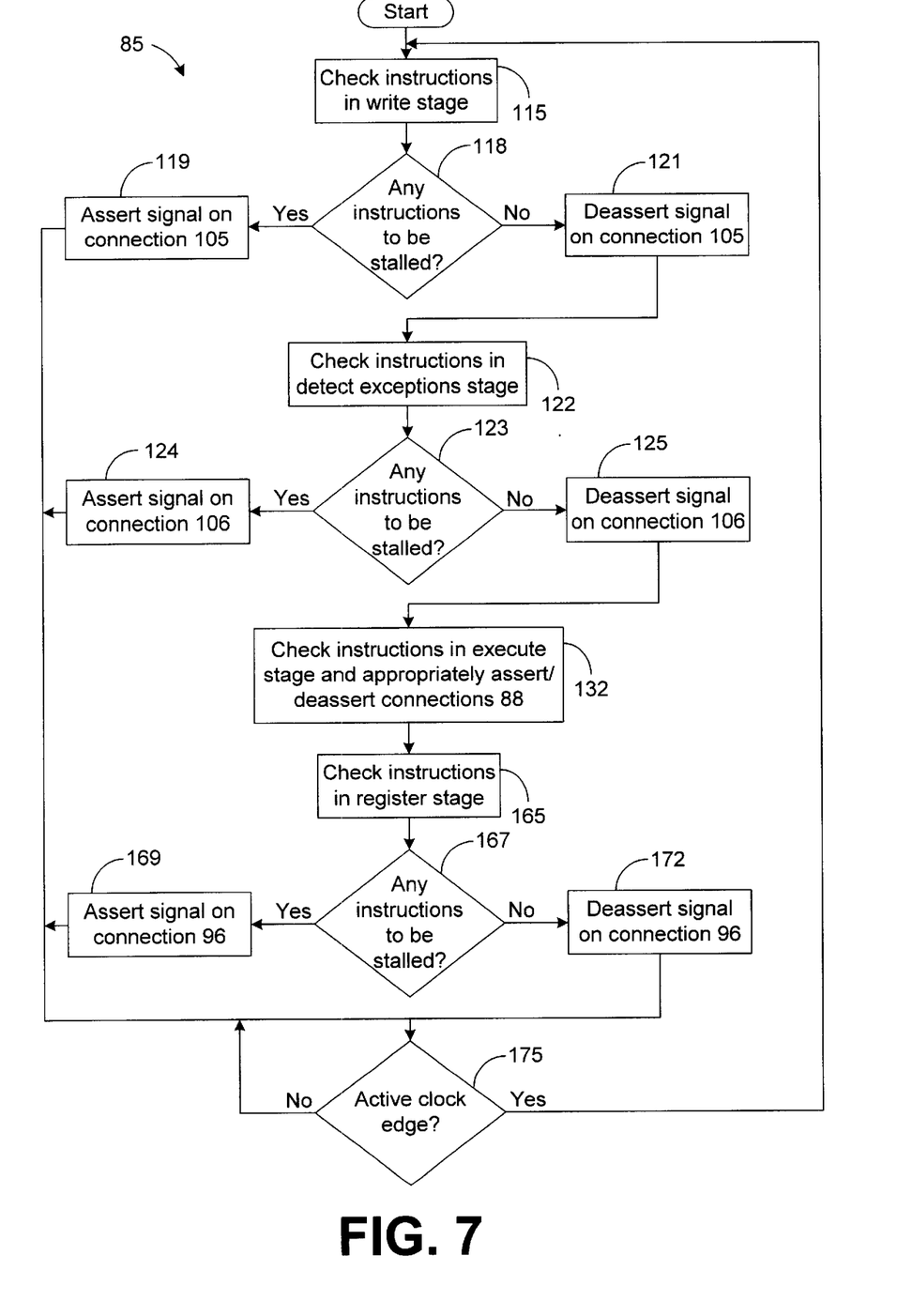
FIG. 7 is a flow chart illustrating the architecture and functionality of the control mechanism depicted in FIG. 6.

The control mechanism 85 monitors the instructions being processed by the pipelines 75 to determine if any stalls should occur, through techniques well known in the art. As shown by FIG. 7, the control mechanism 85 checks the data defining each instruction in the write stage 83 to determine if any of the instructions in the write stage 83 should be stalled, as depicted by blocks 115 and 118. If any of the instructions in the write stage 83 should be stalled, then control mechanism 85 asserts a stall signal on connection 105 in block 119. Otherwise, the control mechanism 85 deasserts the stall signal on connection 105 in block 121 and then checks the instructions in the detect exceptions stage 81 to determine if any of these instructions should be stalled, as shown by blocks 122 and 123. If any of the instructions in the detect exceptions stage 81 should be stalled, the control mechanism 85 asserts the stall signal on connection 106 in block 124. Otherwise, the control mechanism 85 deasserts the stall signal on connection 106 in block 125.

After performing block 125, the control mechanism 85 checks the instructions in the execution stage 79 and appropriately asserts the stall signals on connections 88, as shown by block 132. In this regard, the control mechanism 85 checks the first instruction "in program order" (i.e., checks the oldest instruction) in the execution stage 79, as shown by blocks 141 and 145 of FIG. 8. If the instruction should be stalled (e.g., if the data necessary to properly execute the instruction is not yet available), then the control mechanism 85 asserts the signal on connection 88 coupled to the pipeline 75 processing the instruction and asserts the signals on each connection 88 coupled to a pipeline 75 processing a younger instruction than the one checked in block 145, as shown by blocks 147 and 149. Otherwise, the control mechanism 85 deasserts the connection 88 coupled to the pipeline 75 processing the checked instruction, as depicted by block 152. The control mechanism 85 then does the same for each of the instructions in the execution stage 79 until an instruction that needs to be stalled is found, as shown by blocks 145, 152, 155, and 157.

Figure 8:
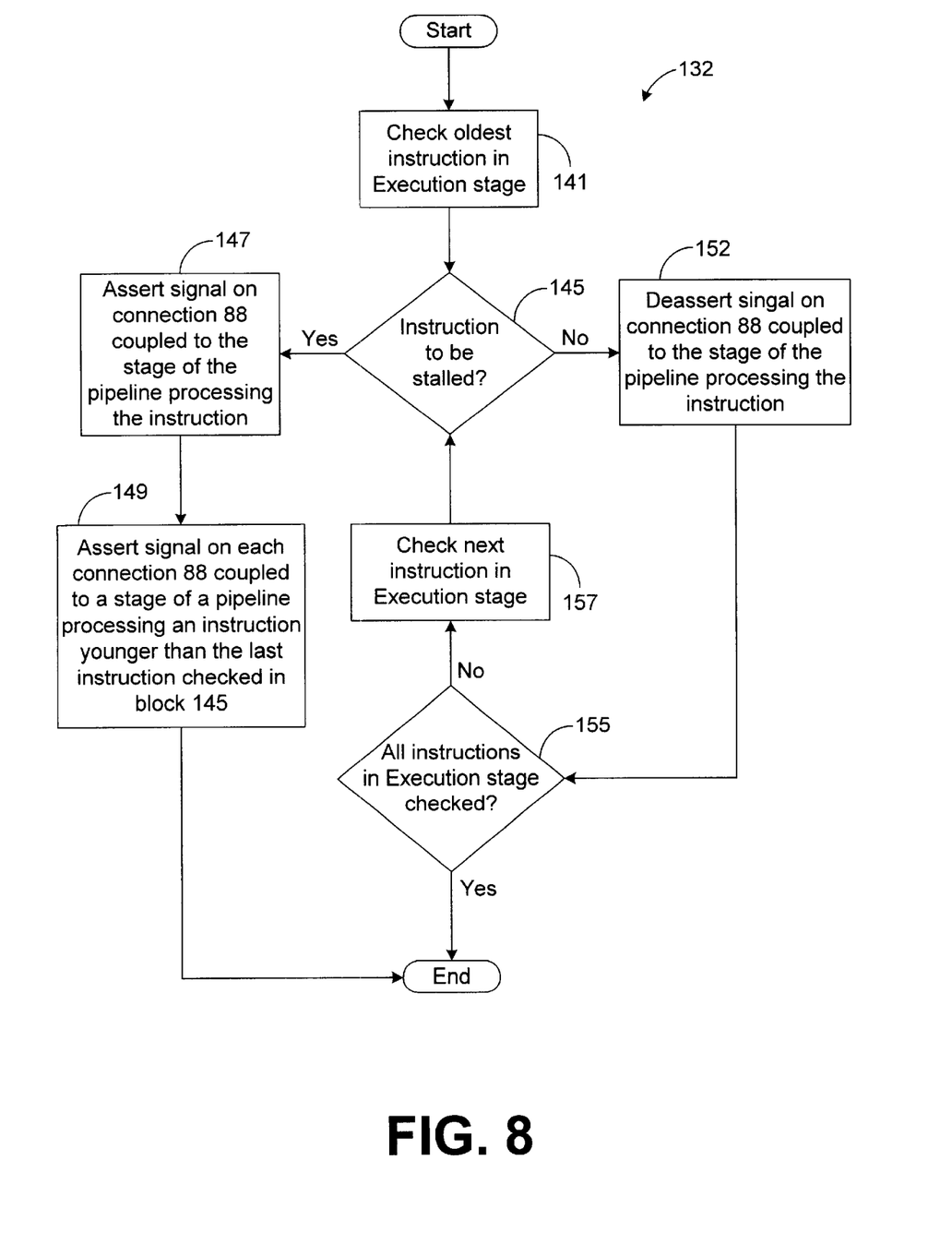
FIG. 8 is a flow chart illustrating in more detailed view of a portion of the architecture and functionality of the control mechanism shown in FIG. 7.

As a result, for each active edge of the clock signal, the instructions in the execution stage 79 that have access to the necessary data for execution and that are older than all instructions dependent on unavailable data are allowed to execute and to proceed to the next stage (i.e., the detect exceptions stage 81 in the preferred embodiment). However the instructions in the execution stage 79 that do not yet have access to the necessary data for execution or that are younger than any instruction dependent on unavailable data are stalled (i.e., are prevented from proceeding to the next stage).

Referring again to FIG. 7, the control mechanism 85 also checks the instructions in the register stage 77 to determine if any of these instructions should be stalled, as shown by blocks 165 and 167. If any of the instructions in the register stage 77 should be stalled, the control mechanism 85 asserts the stall signal on connection 96 in block 169. Otherwise, the control mechanism 85 deasserts the stall signal on connection 96 in block 172.

Consequently, if any of the instructions in the write stage 83 should be stalled, then each instruction in all of the stages 77, 79, 81, and 83 is stalled. If any of the instructions in the detect exceptions stage 81 should be stalled, then each of the instructions in the detect exceptions stage 81, the execution stage 79, and the register stage 77 is stalled. Furthermore, if any of the instructions in the execution stage 79 should be stalled, then these instructions and each instruction in the execution stage 79 younger than any of these instructions are stalled. Furthermore, each instruction in the register stage 77 is also stalled. Finally, if any of the instructions in the register stage 77 should be stalled, then each of the instructions in the register stage 77 is stalled. Once the next active edge of the clock signal occurs, the process described hereinabove is repeated, as depicted by block 175.

Assume for illustrative purposes that after checking each of the instructions in each of the stages 77, 79, 81, and 83 of each of the pipelines 75, only one instruction, which is in the execution stage 79, is dependent on unavailable data. As a result, the signals on connections 88 coupled to an execution stage 79 processing the one instruction or processing an instruction younger than the one instruction are asserted. In other words, the one instruction and the instructions in the execution stage 79 younger than the one instruction are stalled. This results in the signal on connection 99 being asserted as well. However, each of the other signals on connections 105 and 106 and the signals on the remaining connections 88 are deasserted.

As a result, each of the instructions in the detect exceptions stage 81 advances into the write stage 83 on the next active edge of the clock signal, and each of the instructions (except the stalled instructions) in the execution stage 79 advances into the detect exceptions stage 81 on the same active edge of the clock signal. However, the instructions in the register stage 77 remain in the register stage 77, and the stalled instructions in the execution stage 79 remain in the execution stage 79 on the aforementioned active edge of the clock signal.

Assume further that the data necessary to execute the one instruction described above (i.e., the one instruction in the execution stage 79 dependent on unavailable data) becomes available. After this instruction is checked by control mechanism 85 in block 141 of FIG. 8, the connection 88 connected to the pipeline 75 processing this instruction is deasserted in block 152. Furthermore, the connections 88 coupled to the pipelines 75 processing the instructions in the execution stage 79 younger than this one instruction are also deasserted (assuming that each of these instructions is not dependent on unavailable data). As a result, the connection 99 is also deasserted. If the instructions in the detect exceptions stage 81 step into the write stage 83 on the next active edge of the clock signal, then the previously stalled instructions in the execution stage 79 step into the detect exceptions stage 81. Furthermore, the instructions in the register stage 77 step into the execution stage 79, and a new issue group steps into the register stage 77.

As can be seen by the above-described illustration, the instructions in the execution stage 79 capable of executing are allowed to execute and to advance to other stages, while the instructions in the execution stage 79 not ready to execute (e.g., the instructions dependent on unavailable and each instruction younger than another instruction in the execution stage that is dependent on unavailable data) are stalled in the execution stage 79. Furthermore, at no point in the processing of the data by the pipelines 75 does one instruction from one issue group ever enter into the same type of stage that is processing an instruction from another issue group in any one of the pipelines 75. In other words, the processing of system 20 is in-order. As a result, the efficiency of the system 20 is maximized without significantly increasing the complexity of the control mechanism 85.

Although the program 41 provides the instructions to the processing system 20 in the preferred embodiment, it should be noted that the instructions may be provided from different sources without departing from the principles of the present invention. For example, the instructions may be located on a computer disk and interfaced with the processing system 20 via disk storage mechanism 32. In another example, the instructions may be provided from network 35. Furthermore, the instructions may be compiled before being interfaced with system 15 or may be written in a form compatible with processing system 20, thereby eliminating the need for compilation. Therefore, receiving instructions from a program 41 stored in local memory 44 should not be deemed to be an essential feature of the present invention.

In addition, it should be further noted that the present invention is described herein as stalling instructions that are dependent on unavailable data. However, as known in the art, there may be other reasons for stalling instructions. It should be apparent to one skilled in the art that the principles of the present invention may be employed to stall instructions for these other reasons. Therefore, a "yes" determination is preferably made in blocks 118, 123, 167, and 145 of FIGS. 7 and 8 whenever the instruction being analyzed is to be stalled for any reason. The analyzed instruction being dependent on unavailable data is just one example of when it should be stalled.

Furthermore, the methodology described hereinabove allows some of the instructions in the execution stage 79 to complete the execution stage 79 and step into the next stage 81 while other instructions in the execution stage 79 are stalled. However, these principles are not limited to just the execution stage 79. In this regard, it should be apparent to one skilled in the art upon reading this disclosure that the principles of the present invention may be applied to the other stages 77, 81, and 83 such that it is possible to stall only a portion of the instructions in one of the stages 77, 81, or 83 while allowing the other instructions in the same stage to step into the next stage. Accordingly, the same methodology used to analyze and stall instructions in the execution stage 79 may be used to analyze and stall the instructions in any of the other stages 77, 81 and/or 83, if desired.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the claims.

What is claimed is:

1. An in-order superscalar processing system for efficiently processing instructions of computer programs, comprising:

a plurality of pipelines;

an instruction dispersal unit configured to receive instructions of a computer program and to define issue groups based on said received instructions, said instruction dispersal unit further configured to transmit said issue groups to said pipelines, each of said issue groups including instructions to be simultaneously processed by different ones of said pipelines, said instruction dispersal unit configured to ensure that each instruction of said issue groups is free of data dependencies with any of the other instructions of the same issue group; and a control mechanism configured to analyze instructions in one of said issue groups during processing of said instructions in said one issue group by said pipelines, said control mechanism further configured to determine whether any of said instructions in said one issue group is dependent on unavailable data, said control mechanism further configured to stall an instruction in said one issue group that is dependent on said unavailable data and configured to simultaneously enable further processing of other instructions in said one issue group.

2. The system of claim 1, wherein said control mechanism is further configured to stall, based on said unavailable data, each instruction in said one issue group that is determined by said control mechanism to be younger than said instruction determined to be dependent on said unavailable data.

3. The system of claim 1, wherein each instruction in said one issue group includes data indicating said each instruction'sage with respect to other instructions in said one issue group, wherein said control mechanism is further configured to analyze in program order said instructions in said one issue group based on said data.

4. The system of claim 1, wherein said instruction dispersal unit is configured to simultaneously transmit each of said instructions of said one issue group to a different one of said pipelines.

5. The system of claim 1, wherein said control mechanism is configured to stall another instruction of said one issue group based on said unavailable data thereby ensuring that said instructions of said one issue group complete execution in program order.

6. The system of claim 1, wherein at least one instruction in said one issue group includes data indicating an age of said at least one instruction with respect to other instructions in said one issue group, and wherein said control mechanism is configured to determine whether to stall said at least one instruction based on said data indicating said age.

7. The system of claim 1, wherein each of said instructions of said one issue groups is successively executed by said pipelines.

8. The system of claim 1, wherein said control mechanism is configured to stall, based on said unavailable data, at least one instruction in one of said pipelines thereby ensuring that said instructions of said computer program complete execution in program order, wherein said one pipeline is enabled by said control mechanism to process one of said instructions of said one issue group during the stall of said instruction dependent on said unavailable data.

9. The system of claim 8, wherein said instruction dependent on said unavailable data is processed by another of said pipelines.

10. A computer processing system for efficiently processing instructions of computer programs, comprising:

an instruction dispersal unit configured to receive instructions of a computer program and to define issue groups based on said received instructions, said instruction dispersal unit further configured to transmit said issue groups, each of said issue groups including instructions to be simultaneously processed by said system, said instruction dispersal unit configured to ensure that each instruction of said issue groups is free of data dependencies with any of the other instructions of the same issue group;

a plurality of pipelines configured to receive said instructions of said issue groups from said instruction dispersal unit, wherein each of said instructions is processed by a different one of said pipelines with respect to each of the other instructions in the same issue group; and a control mechanism configured to determine to stall an instruction in one of said issue groups in response to a determination that said stalled instruction is dependent on unavailable data, said control mechanism further configured to selectively stall other instructions in said one issue group based on an age of each of the other instructions in said one issue group with respect to said stalled instruction.

11. The system of claim 10, wherein said control mechanism is further configured to analyze said instructions in said one issue group from oldest to youngest.

12. The system of claim 10, wherein said instruction dispersal unit is configured to simultaneously transmit each instruction of said one issue group to a different one of said pipelines.

13. The system of claim 10, wherein said plurality of pipelines are configured to ensure that instructions of any one of said issue groups do not pass, in said pipelines, instructions of any another of said issue groups.

14. An in-order superscalar processing method for efficiently processing instructions of computer programs, comprising the steps of:

receiving instructions from a computer program;

defining issue groups based on said instructions, each of said issue groups including instructions that may be simultaneously processed;

sequentially transmitting said issue groups to a plurality of pipelines;

simultaneously processing each instruction in one of said issue groups via a corresponding stage of a different one of said pipelines;

stalling a first instruction in said one issue group;

enabling processing of other instructions in said one issue group while said first instruction is stalled in said stalling step; and selectively stalling other instructions in said one issue group based on an age of each selectively stalled instruction with respect to an age of said first instruction.

15. The method of claim 14, further comprising the steps of:

determining whether instructions in said one issue group are dependent on unavailable data; and performing said stalling a first instruction step in response to a determination in said determining step that said first instruction is dependent on unavailable data.

16. The method of claim 14, further comprising the step of ensuring that an instruction younger than said first instruction does not complete execution before said first instruction.

17. The method of claim 14, further comprising the step of including age data in at least one of said selectively stalled instructions, wherein said selectively stalling step is based on said age data.

18. The method of claim 14, wherein said defining step comprises the step of ensuring that each instruction of said issue groups is free of data dependencies with any of the other instructions of the same issue group.

19. The method of claim 14, further comprising the step of stalling, based on said stalling a first instruction step, an instruction being processed by one of said pipelines that is enabled, via said enabling step, to process an instruction of said one issue group during said stalling a first instruction step.

20. An in-order superscalar processing method for efficiently processing instructions of computer programs, comprising the steps of:

receiving instructions from a computer program;

defining issue groups based on said instructions, each of said issue groups including instructions that may simultaneously execute within a computer processor, said defining step comprising the step of ensuring that each instruction of said issue groups is free of data dependencies with any of the other instructions of the same issue group;

processing said issue groups in stages within said computer processor;

stalling an instruction in said one issue group;

enabling other instructions in said one issue group to advance to another stage while said instruction is stalled by said stalling step; and selectively stalling other instructions in said one issue group based on said stalling an instruction step thereby ensuring that said instructions of said computer program complete execution in program order.

21. The method of claim 20, further comprising the steps of:

determining whether instructions in said one issue group are dependent on unavailable data; and performing said stalling an instruction step in response to a determination in said determining step that said instruction stalled in said stalling an instruction step is dependent on unavailable data.

22. The method of claim 20, further comprising the steps of:

determining which of said instructions in said one issue group are younger than said instruction stalled in said stalling step; and stalling each of said instructions in said one issue group determined to be younger than said instruction stalled in said stalling step.

23. The method of claim 20, further comprising the step of including age data in at least one of said selectively stalled instructions, wherein said selectively stalling step is based on said age data.

24. The method of claim 20, further comprising the step of ensuring that instructions in said one issue group do not pass, in said pipelines, instructions in any other of said issue groups.

25. The method of claim 20, wherein said processing step comprises the step of processing each instruction of said one issue group in a corresponding stage of different one of said pipelines.

26. A superscalar processing system, comprising:

a plurality of pipelines, each of said pipelines having a plurality of stages;

an instruction dispersal unit configured to receive instructions and to define an issue group based on said received instructions, said issue group including a plurality of instructions to be successively executed by said pipelines in program order, each of said instructions to be simultaneously processed by a corresponding stage of a different one of said pipelines; and a control mechanism configured to initiate a stall of one of said instructions in response to a determination that said one instruction is dependent on unavailable data, said control mechanism configured to stall each instruction in said issue group that is younger than said one instruction during said stall of said one instruction, wherein said control mechanism is further configured to enable further processing, by one of said pipelines during said stall of said one instruction, an instruction of said issue group that is older than said one instruction.

27. The system of claim 26, wherein said instruction dispersal unit is configured to ensure that each instruction of said issue group is free of data dependencies with any of the other instructions of said issue group.

28. The system of claim 26, wherein at least one instruction in said issue group includes data indicating an age of said at least one instruction with respect to other instructions in said issue group, and wherein said control mechanism is configured to determine whether to stall said at least one instruction based on said data indicating said age.

29. The system of claim 26, wherein said control mechanism is configured to stall an instruction in said enabled pipeline based on said determination, and wherein said stall of said one instruction occurs in another of said pipelines.

* * * * *

UNITED STATES PATENT AND TRADEMARK OFFICE
CERTIFICATE OF CORRECTION

PATENT NO.     : 6,618,802 B1
DATED          : September 9, 2003
INVENTOR(S)    : Arnold et al.

It is certified that error appears in the above-identified patent and that said Letters Patent is hereby corrected as shown below:

Column 13,
Line 27, delete "instruction' sage" and insert therefor -- instruction's age --

Signed and Sealed this

Twenty-second Day of March, 2005

JON W. DUDAS
*Director of the United States Patent and Trademark Office*